(12) United States Patent
Matsen et al.

(10) Patent No.: US 6,884,976 B2
(45) Date of Patent: Apr. 26, 2005

(54) INDUCTION HEATING FOR LOCALIZED JOINING OF STRUCTURAL MEMBERS

(75) Inventors: Marc R. Matsen, Seattle, WA (US); Terry L. Smith, Renton, WA (US)

(73) Assignee: The Boeing Company, Chicago, IL (US)

( * ) Notice: Subject to any disclaimer, the term of this patent is extended or adjusted under 35 U.S.C. 154(b) by 155 days.

(21) Appl. No.: 10/306,684

(22) Filed: Nov. 27, 2002

(65) Prior Publication Data

US 2004/0099660 A1 May 27, 2004

(51) Int. Cl.[7] .................................................. H05B 6/10
(52) U.S. Cl. ..................... 219/634; 219/632; 219/635; 219/615; 219/675; 219/603; 219/670; 219/672; 72/58; 72/60; 72/709
(58) Field of Search ................................. 219/632–635, 219/615–617, 675–677, 603, 670, 672; 72/58, 60, 707, 709

(56) References Cited

U.S. PATENT DOCUMENTS

| | | | |
|---|---|---|---|
| 3,753,798 A | 8/1973 | Komatsu et al. | |
| 4,142,923 A | 3/1979 | Satava | |
| 4,658,362 A | 4/1987 | Bhatt | |
| 4,713,953 A | 12/1987 | Yavari | |
| 4,811,890 A | 3/1989 | Dowling et al. | |
| 4,820,355 A | 4/1989 | Bampton | |
| 4,956,008 A | 9/1990 | McQuilkin | |
| 5,025,974 A | 6/1991 | Strickland | |
| 5,115,963 A | 5/1992 | Yasui | |
| 5,181,969 A | 1/1993 | Komatsubara et al. | |
| 5,277,045 A | 1/1994 | Mahoney et al. | |
| 5,289,965 A | 3/1994 | Yasui et al. | |
| 5,309,747 A | 5/1994 | Yasui | |
| 5,338,920 A * | 8/1994 | Okusaka et al. | 219/633 |
| 5,410,132 A | 4/1995 | Gregg et al. | |
| 5,419,170 A | 5/1995 | Sanders et al. | |
| 5,420,400 A | 5/1995 | Matsen | |
| 5,467,626 A | 11/1995 | Sanders | |
| 5,530,227 A | 6/1996 | Matsen et al. | |
| 5,587,098 A * | 12/1996 | Matsen et al. | 219/615 |
| 5,603,449 A | 2/1997 | Mansbridge et al. | |
| 5,638,724 A | 6/1997 | Sanders | |
| 5,645,744 A | 7/1997 | Matsen et al. | |
| 5,661,992 A | 9/1997 | Sanders | |
| 5,683,607 A | 11/1997 | Gillespie et al. | |
| 5,683,608 A | 11/1997 | Matsen et al. | |
| 5,700,995 A | 12/1997 | Matsen | |
| 5,705,794 A | 1/1998 | Gillespie et al. | |
| 5,728,309 A | 3/1998 | Matsen et al. | |
| 5,737,954 A | 4/1998 | Yasui | |
| 5,808,281 A | 9/1998 | Matsen et al. | |
| 5,823,032 A | 10/1998 | Fischer | |
| 5,831,252 A * | 11/1998 | Shimizu | 219/603 |
| 5,914,064 A | 6/1999 | Gillespie et al. | |
| 6,322,645 B1 | 11/2001 | Dykstra et al. | |
| 6,337,471 B1 | 1/2002 | Kistner et al. | |

* cited by examiner

Primary Examiner—Shawntina Fuqua
(74) Attorney, Agent, or Firm—Alston & Bird LLP

(57) ABSTRACT

An apparatus and a method for forming a localized joint in at least one structural member are provided. The apparatus includes a tool that corresponds to a joint portion of the structural member. An induction coil is disposed in the tool, and a power source is configured to energize the induction coil. A susceptor disposed between the tool and the structural member has a Curie temperature at which the susceptor becomes paramagnetic such that an electromagnetic field induced in the susceptor by the induction coil heats the susceptor to the Curie temperature for forming the joint.

23 Claims, 6 Drawing Sheets

INDUCTION HEATING FOR LOCALIZED JOINING OF STRUCTURAL MEMBERS

BACKGROUND OF THE INVENTION

1. Field of the Invention

The present invention relates to the joining of structural members and, more particularly, relates to an apparatus and associated method for using induction heating to form a localized joint in or between one or more structural members, such as for repairing a structural assembly.

2. Description of Related Art

Localized joints within a single structural member or between portions of multiple structural members are often formed during or after the assembly of such structural members. For example, structural assemblies that are formed by assembling multiple structural members can require localized joining for the repair of one or more of the structural members or the joints between the structural members. According to one conventional method of repairing such structural assemblies in the aerospace industry, a damaged portion of the structural assembly requiring repair is heated and repaired by brazing or otherwise joining a patch of material over the damaged area. A minimum temperature is often required for making an effective repair, and excessive heating can cause damage to the structural assembly or detract from the material properties thereof.

Therefore, a plurality of resistive heaters and thermocouples are fitted to the area of the repair. The resistive heaters are individually energized to provide a distribution of heat to the repair area, and the thermocouples are used to monitor the temperature over the area. Additional energy is provided to the heaters in the cooler areas, and the repair area is thus heated substantially uniformly to a bonding or brazing temperature at which the joint can be formed. Undesirably, the placement of the heaters and thermocouples can be complicated by the geometrical configuration of the structural assembly, the high temperature to which the assembly must be heated, and the need for high uniformity of temperature within the repair region. If the heaters and thermocouples are improperly placed, monitored, or controlled, the assembly can be damaged or the joint can be ineffective. Further, the method is time consuming and labor intensive, lengthening the time and cost of manufacture of the assembly.

Thus, there exists a need for an apparatus and associated method for forming localized joints in and between structural members, including those joined to form complex structural assemblies. The apparatus should provide a uniform temperature to the area of the joint and should also be cost effective and adaptable to variations in the configurations of the structural assembly.

SUMMARY OF THE INVENTION

The present invention provides a method and an apparatus for forming a localized joint in a joint portion of at least one structural member. The apparatus includes a tool with an induction coil for inducing an electromagnetic field in a susceptor, and thereby heating the susceptor to a Curie temperature at which the susceptor becomes paramagnetic. Thus, the apparatus can heat the susceptor and the joint area of the structural member to a uniform temperature. Further, the tool, which can be formed of ceramic, can correspond to the shape of the joint portion, even where the structural assembly defines a complicated geometric configuration.

According to one embodiment, the induction coil is disposed in the tool, and a power source is configured to energize the induction coil. The susceptor is disposed between the tool and the structural member such that the induction coil can induce an electromagnetic field substantially uniformly in the susceptor. An electromagnetic shield material can direct the electromagnetic field into the susceptor. A joining member can also be provided in thermal contact with the susceptor and configured to be joined to the structural member at the Curie temperature of the susceptor. The Curie temperature of the susceptor can be about equal to a joining temperature of the structural member for forming the joint.

According to one aspect of the invention, a sealing member is configured to provide a hermetic seal between the tool and the structural member around the joint portion of the structural member. An evacuation device is fluidly connected to a space between the tool and the structural member and configured to remove gas from therebetween. A coolant source can also be fluidly connected to a passage of the induction coil and configured to circulate a cooling fluid through the induction coil.

The present invention also provides a method for forming a localized joint in a joint portion of at least one structural member, such as a member formed of titanium or titanium alloys. The method includes configuring a susceptor proximate to at least one structural member so that the susceptor corresponds in shape to a joint portion of the structural member. The susceptor can be formed from materials selected according to the structural member such that the Curie temperature corresponds to a joining temperature of the structural member. A tool with an induction coil is positioned proximate to the susceptor, for example, by disposing an uncured material proximate to the structural member and curing the material to form the tool. The tool can also be hermetically sealed to the structural member, and gas can be evacuated from therebetween to engage the tool to the structural member. The induction coil is energized, for example, by actuating a power source in electrical communication therewith, to induce an electromagnetic field in the susceptor and heat the susceptor and the structural member. For example, the induction coil can be energized to heat the susceptor to a Curie temperature at which the susceptor becomes paramagnetic. Thus, a joint is formed in the structural member at the joint portion. Additionally, a joining material such as aluminum and/or a joining member can be disposed between the susceptor and the structural member and heated therebetween, for example, to a melting temperature, to form the joint. According to one aspect, a cooling fluid is circulated through the induction coil.

BRIEF DESCRIPTION OF THE DRAWINGS

The foregoing and other advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein.

DETAILED DESCRIPTION OF THE INVENTION

The present invention now will be described more fully hereinafter with reference to the accompanying drawings, in which some, but not all embodiments of the invention are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
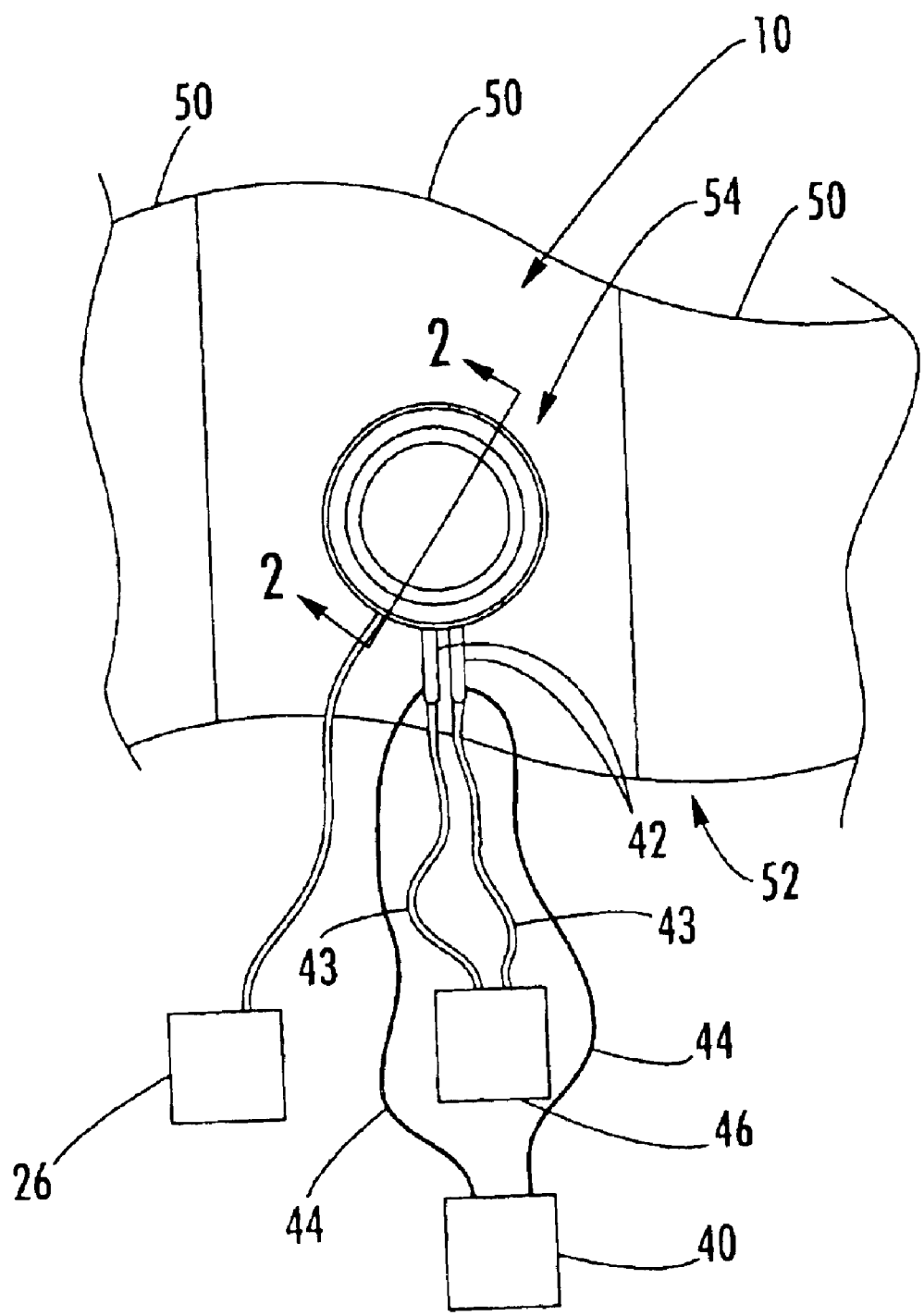
FIG. 1 is an elevation view illustrating an apparatus for forming a localized joint in a structural member according to one embodiment of the present invention.
Figure 2:
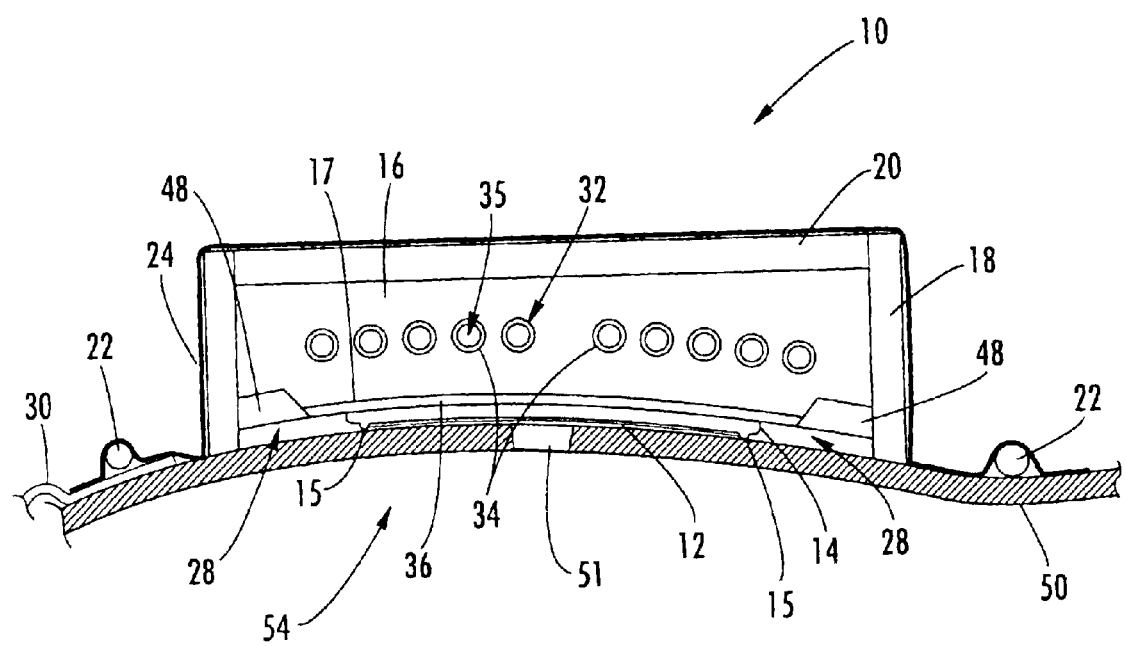
FIG. 2 is section view of the apparatus of FIG. 1 as seen along line 2—2 of FIG. 1.

Referring now to the drawings, and in particular to FIGS. 1 and 2, there is illustrated an apparatus 10 for forming a localized joint in one or more structural members 50, according to one embodiment of the present invention. By the term "localized," it is meant that the joint is formed in only a portion, or joint portion 54, of the structural member 50 such that the apparatus 10 need not heat or otherwise process or accommodate the entire structural member 50. The apparatus 10 can be used to join structural members 50 to form a structural assembly 52 or to form a joint for repairing a defective or damaged area 51 in the structural members 50. For example, if one of the structural members 50 is damaged before, during, or after the assembly of the structural assembly 52, the apparatus 10 can be used to repair the structural member 50, thereby restoring the structural assembly 52 to a useful condition without replacing the damaged structural member 50. As described further below, the structural member 50 can be repaired by melting a joining material 12 that joins a joining member 14, such as a patch, to the structural member 50. Similarly, the apparatus 10 can be used to form a localized joint between two or more adjacent structural members 50 during assembly of the structural assembly 52.

The structural members 50 can be formed of a variety of materials including titanium, steel, aluminum, alloys thereof, other metals, composite materials, polymers, and the like. The structural members 50 and the resulting structural assembly 52 can be utilized in various applications. For example, the structural members 50 may be panels that form a portion of the body of a vehicle, such as aircraft. Alternatively, one or more of the structural members 50 can be formed and/or joined to form support structures, airfoils, or vessels such as pressurized or non-pressurized vessels for containing fluids.

The forming apparatus 10 includes a tool 16 with a heating device 32 for heating the one or more structural members 50 that are to be joined. Preferably, the tool 16 is formed of a material having a low thermal expansion, a low thermal conductivity, and low electromagnetic absorption. For example, the tool 16 can be formed of a material having a thermal expansion of less than about $0.45/(°\text{F.} \times 10^6)$ throughout a temperature range of between about 0° F. and 1850° F., a thermal conductivity of about 4 Btu/(hr)(ft)(° F.) or less, and substantially no electromagnetic absorption. According to one embodiment of the present invention, the tool 16 is formed of cast ceramic, for example, using a castable fusible silica product such as Castable 120 available from Ceradyne Thermo Materials of Scottdale, Ga. Castable 120 has a coefficient of thermal expansion less than about $0.45/(°\text{F.} \times 10^6)$ a thermal conductivity of about 0.47 Btu/(hr)(ft)(° F.), and a low electromagnetic absorption. The low electromagnetic absorption of the tool 16 prevents the tool from substantially absorbing and being heated by electromagnetic energy provided for heating the structural member 50. Further, the low thermal conductivity of the tool 16 prevents the tool from substantially conducting thermal energy from the joint portion 54 of the structural member 50 to the other portions of the structural member 50. Due to the low thermal expansion of the tool 16, a large thermal gradient can be maintained in the tool without developing high stresses, which can result in spalling of the tool 16 material.

The tool 16 can be formed to correspond to the contour of the joint portion 54 of the structural member 50. For example, the material used to form the tool 16 can be disposed on the joint portion 54 of the structural member 50 in an uncured state and cured thereon such that a surface 17 of the tool 16 corresponds to the joint portion 54 of the structural member 50. The tool 16 can also define curved or edged surface contours to correspond to one or more surfaces of the structural member 50. Further, the outer periphery of the tool 16 can correspond to the size and/or shape of the joint portion 54. Thus, although a circular tool 16 is illustrated in FIGS. 1 and 2, the tool 16 can alternatively define a variety of shapes. Additionally, a tool support structure 18 can be provided to support the tool 16 as shown in FIG. 2. For example, if the tool 16 is formed of a ceramic material that is disposed in an uncured state on the structural member 50, the tool support structure 18 can hold the ceramic material while it dries or cures. The tool support structure 18 also provides additional strength to the tool 16 after the ceramic cures. In one embodiment, the tool support structure 18 is formed of a section of PVC pipe, which can be closed at one end by a backing portion 20 of the tool support structure 18. Alternatively, the tool support structure 18 can be formed of a variety of other materials including metals, polymers, phenolic materials, and the like. The tool support structure 18 can additionally include other members, such as rods that extend into or through the ceramic material to further engage the ceramic portion of the tool 16.

A sealing member 22 extends around the tool 16 and is configured to be engaged to the structural member 50 to form a seal between the tool 16 and the structural member 50 around the joint portion 54. The sealing member 22 can be formed of, for example, a sticky, rope-like elastomeric material such as Tacky Tape® vacuum bag sealant, registered trademark of Schnee Moorehead, Inc. of Irving, Tex. The sealing member 22 can be connected to, or integrated with, a sealing membrane 24 that overlays the tool 16 as shown in FIG. 2. The sealing membrane 24 can be formed of various materials, including an elastomeric sheet formed of various polymers. With the tool 16 configured proximate to the structural member 50, the sealing membrane 24 is configured to cover the tool 16 as shown in FIG. 2. Preferably, the sealing member 22 hermetically seals the tool 16 between the sealing membrane 24 and the structural member 50. An evacuation device 26 can also be connected to the apparatus 10 and configured to remove gas from a space 28 between the structural member 50 and the sealing membrane 24 and, hence, between the structural member 50 and the tool 16. The evacuation device 26 is fluidly connected to the space 28 by an evacuation tube 30, which is disposed against the structural member 50 and extends between the structural member 50 and the sealing member 22 as shown in FIG. 2. Alternatively, a hole may be provided in the sealing membrane 24 for receiving the evacuation tube 30, and/or the tube 30 may extend through the tool 16. By evacuating gas from within the sealing membrane 24, the apparatus 10 can urge the tool 16 against the structural member 50 and hold the tool 16 in place during the joining process. The partial vacuum established between the structural member 50 and the tool 16 can provide the entire support for holding the apparatus 10 against the structural member 50, or additional support can be provided manually by an operator or by a device for automatically manipulating the apparatus 10. In addition, the removal of gases from the space 28 between the tool 16 and the structural member 50 can reduce the likelihood that oxidation will occur during processing, thereby improving the quality of the resulting joint.

Figure 3:
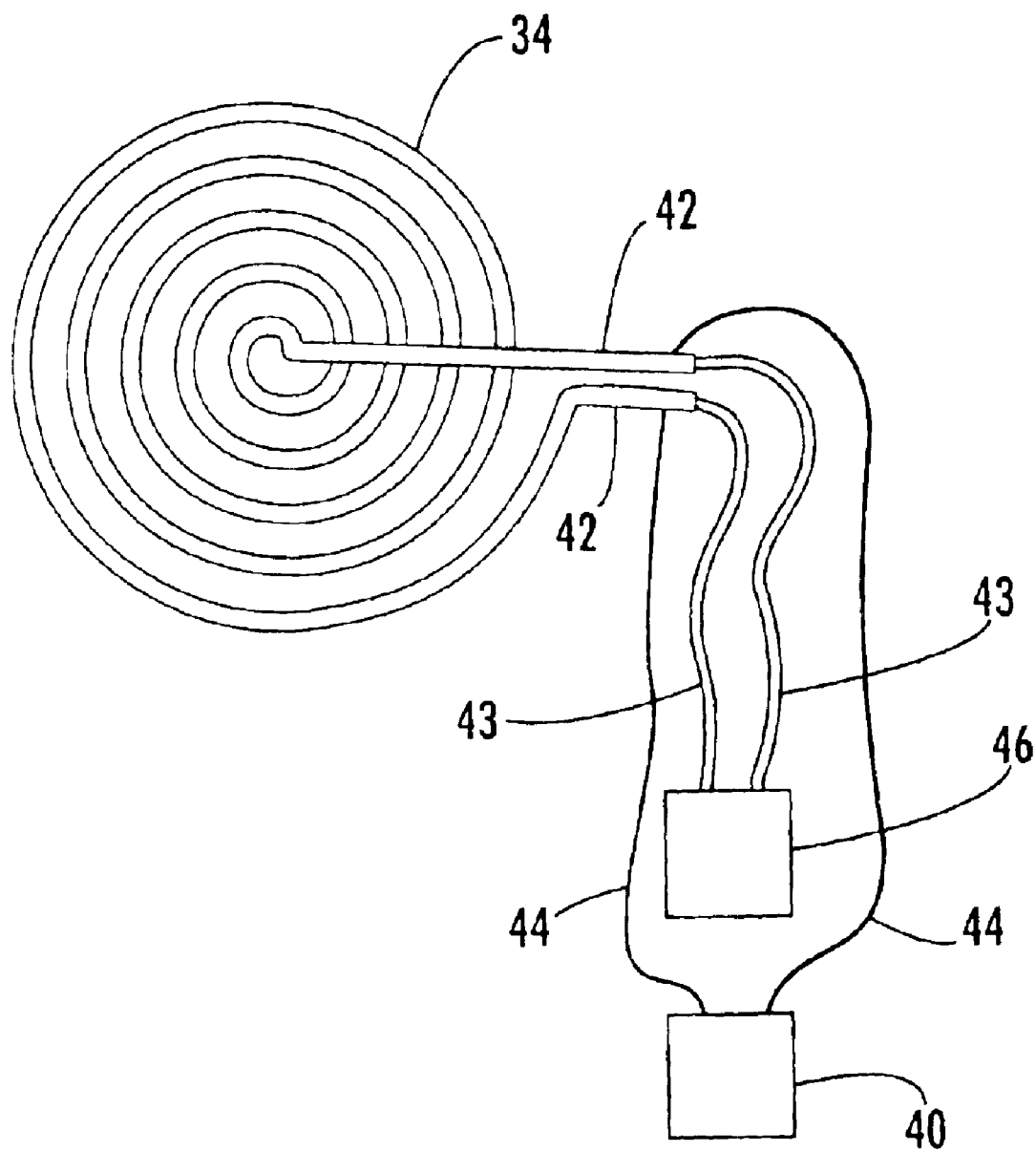
FIG. 3 is an elevation view illustrating the induction coil of the apparatus of FIG. 1.

As shown in FIG. 2, the heating device 32 of the tool 16 is configured to heat the structural members 50 during processing. The heating device 32 can comprise various types of heaters. Preferably, the heating device 32 comprises at least one induction coil 34, such as a solenoid coil, for inducing an electromagnetic field in a susceptor 36 that is provided between the tool 16 and the structural member 50. The induction coil 34 can include multiple coil members or a continuous coil member as shown in FIG. 3. According to one embodiment, the induction coil 34 is a hollow tube that is disposed within the tool 16 proximate to the susceptor 36 in which the electromagnetic field is to be induced. In one embodiment, the induction coil 34 is formed of 0.25 inch diameter copper tubing. Lightly drawn copper tubing can be used so that the induction coil 34 can be adjusted as necessary during assembly to correspond to the configuration of the tool 16, the susceptor 36, and/or the structural member 50. For example, the induction coil 34 can be disposed in the tool 16 about 0.5 inch from the susceptor 36, and preferably the coil 34 is distributed throughout the tool 16 to induce the electromagnetic field uniformly throughout the susceptor 36.

The induction coil 34 can be electrically connected to one or more energy sources by various devices including wire or tubular connections. For example, as illustrated in FIGS. 1 and 3, an electrical power source 40 is connected to the induction coil 34 via conductive tubular connections 42 and flexible leads such as conductive wires 44 formed of copper or other conductive materials. The tubular connections 42 can comprise extensions of the copper tubing that forms the induction coil 34, and the tubular connections 42 can extend from the tool 16 through the sealing membrane 24 or between the sealing membrane 24 and the structural member 50 in a fashion similar to the evacuation tube 30 described above. The wires 44 can extend from the tubular connections 42 to the power source 40. Alternatively, the wires 44 can extend into the space 28 to connect to the induction coil 34 therein so that the wires 44 connect the induction coil 34 to the power source 40 without the use of the tubular connections 42.

The power source 40 provides an electrical current, for example, an alternating current of about 3 kHz, to the induction coil 34. The current is conducted through the induction coil 34 and induces an electromagnetic field within the susceptor 36. The electromagnetic field heats the susceptor 36 and, thus, the joining material 12, the joining member 14, and/or the structural member 50. The temperature of the susceptor 36 and the structural member 50 can be determined by monitoring the power supplied by the one or more power sources 40, as described in U.S. application Ser. No. 10/094,494, entitled "Induction Heating Process Control," filed Mar. 8, 2002, and which is assigned to the assignee of the present invention and is incorporated herein by reference. Due to the low electromagnetic absorption of the tool 16, the induction coil 34 induces an electromagnetic field within the susceptor 36 without inducing an appreciable electromagnetic field in the tool 16. Therefore, the susceptor 36 can be heated to high temperatures without heating the tool 16, saving energy and time.

In one embodiment, illustrated in FIG. 2, the induction coil 34 is tubular and defines a passage 35 for circulating a cooling fluid, such as water or air. Each of the tubular connections 42, in combination with one or more hoses, pipes, or tubes 43, provides a fluid connection between the induction coil 34 and a coolant source 46. The coolant source 46 can be pressurized, or a pump (not shown) can be provided for circulating the cooling fluid from the coolant source 46 through the passages 35 of the induction coil 34. The cooling fluid cools the induction coil 34 to prevent the coil 34 from overheating. In addition, the cooling fluid can be used to cool the susceptor 36 and/or the structural member 50, for example, after forming the joint in the structural member 50.

The susceptor 36 preferably is disposed against a surface 17 of the tool 16 and configured proximate to the structural member 50. For example, the susceptor 36 can be cut using a laser or water jet to correspond to the joint portion 54 and positioned between the tool 16 and the joining member 14. The susceptor 36 is formed of a material that is characterized by a Curie temperature at which the susceptor 36 becomes paramagnetic, for example, a ferromagnetic alloy such as an alloy comprising iron and nickel. Susceptors having Curie temperatures at which each susceptor becomes nonmagnetic, or paramagnetic, are described in U.S. Pat. No. 5,728,309 entitled "Method for Achieving Thermal Uniformity in Induction Processing of Organic Matrix Composites or Metals," which issued on Mar. 17, 1998; U.S. Pat. No. 5,645,744 entitled "Retort for Achieving Thermal Uniformity in Induction Processing of Organic Matrix Composites or Metals," which issued on Jul. 8, 1997; and U.S. Pat. No. 5,808,281 entitled "Multilayer Susceptors for Achieving Thermal Uniformity in Induction Processing of Organic Matrix Composites or Metals," which issued on Sep. 15, 1998, each of which is assigned to the assignee of the present invention and is incorporated herein by reference.

Figure 4:
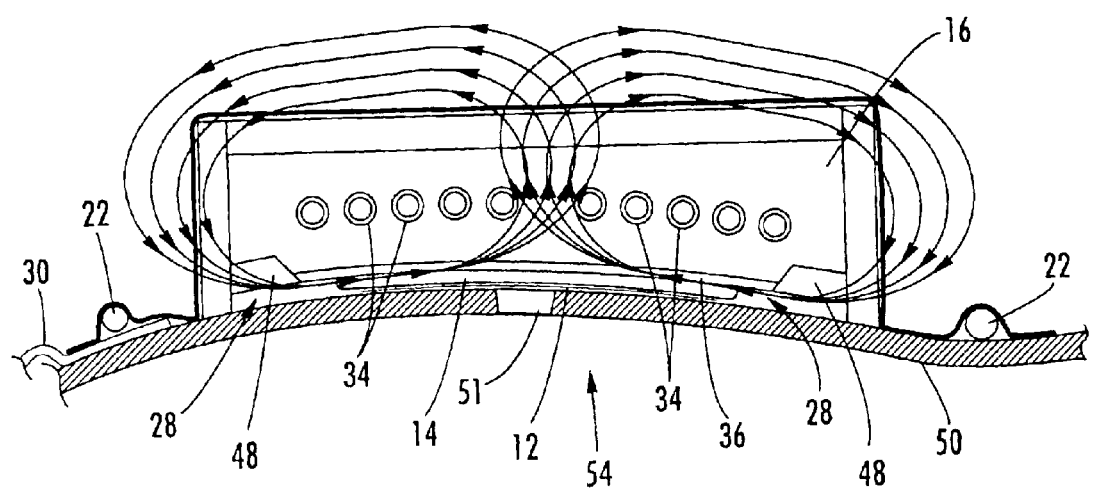
FIG. 4 is a section view of the apparatus of FIG. 1 as seen along line 2—2 of FIG. 1, illustrating an electromagnetic field induced in the susceptor according to one embodiment of the present invention.

Eddy current heating of the susceptor 36 results from eddy currents that are induced in the susceptor 36 by the electromagnetic field generated by the induction coil 34. The flow of the eddy currents through the susceptor 36 results in resistive losses and heating of the susceptor 36. The susceptor 36 is heated to the Curie temperature of the susceptor 36, whereupon the susceptor 36 becomes paramagnetic and does not heat further. If some portions of the susceptor 36 are heated more quickly than other portions, the hotter portions will reach the Curie temperature and become paramagnetic before the other, cooler portions of the susceptor 36. The eddy currents will then flow through the cooler magnetic portions, i.e., around the hotter, paramagnetic portions of the susceptor 36, causing the cooler portions to also become heated to the Curie temperature. Therefore, even if some portions of the susceptor 36 heat at different rates, the entire susceptor 36 is heated to a uniform Curie temperature. Preferably, the susceptor 36 acts as an electromagnetic shield that prevents the induction coil 34 from significantly inducing an electromagnetic field in the structural member 50. As such, the induction coil 34 does not cause appreciable heating of the structural member 50 directly, but rather heats the susceptor 36, which in turn acts as a heat sink for heating the structural member 50, joining material 12, and/or joining member 14. Further, a shield material 48 with a high magnetic permeability can be provided in the tool 16 for directing the electromagnetic field generated by the induction coil 34. The shield material 48 can include, for example, a powder formed of a ferromagnetic material, which prevents the transmission of the electromagnetic field through the shield material 48, preferably without causing substantial heating in the shield material 48. As shown in FIG. 4, the shield material 48 can be provided at a periphery of the susceptor 36 so that the shield material 48 directs the electromagnetic field into the susceptor 36, and the electromagnetic field does not cause substantial induction of the electromagnetic field in the structural member 50. The susceptor 36 can also include a protective coating, such as an oxidation resistant nickel aluminide coating, which can be flame-sprayed or otherwise disposed on the surface of the susceptor 36. A description of a susceptor with a nickel aluminide coating is provided in U.S. application Ser. No. 10/032,625, entitled "Smart Susceptors with Oxidation Control," filed Oct. 24, 2001, and which is assigned to the assignee of the present invention and is incorporated herein by reference.

The susceptor can be formed from materials selected according to the structural member such that the Curie temperature corresponds to a joining temperature of the structural member.

The susceptor 36 can be formed of a variety of materials including cobalt, iron, nickel, and alloys thereof. Because the Curie temperature of the susceptor 36 is affected by the material composition of the susceptor 36, the composition of the susceptor 36 can be designed to achieve a desired Curie temperature that is appropriate for a particular type of structural member 50, joining material 12, joining member 14, and/or joint. For example, the susceptor 36 can be formed by sintering or otherwise solidifying a mixture of powders of different materials selected to form the susceptor 36 with the desired Curie temperature. Preferably, the Curie temperature of the susceptor 36 corresponds to a joining temperature of the structural member 50, i.e., the Curie temperature is equal to a temperature at which the structural member 50 can be joined. For example, the joining temperature of the structural member 50 can be the melting temperature of the structural member 50 or, more preferably, can be equal to a joining temperature of the joining material 12 or the joining member 14, which are selected according to the structural member 50. For example, the joining temperature can be a temperature at which the joining material 12 or joining member 14 are melted, brazed, or otherwise joined. Depending on the thermal characteristics of the apparatus 10, the corresponding Curie temperature can be slightly higher, for example, about 10° F. higher, than the joining temperature so that the joining material 12 and/or joining member 14 reach the joining temperature when the susceptor 36 is heated to the Curie temperature. According to one embodiment, a susceptor 36 with a Curie temperature of about 1250° F. is used to melt the joining material 12 comprising aluminum or an aluminum alloy, such as 3003 aluminum, to braze a titanium patch to a titanium structural member. Alternatively, susceptors 36 with other Curie temperatures can be provided, for example, a Curie temperature of about 350° F. for curing an epoxy joining member 14, such as a carbon fiber patch impregnated with epoxy resin.

Similarly, a Curie temperature of about 450° F. can be provided for applying a patch formed of bismaleimide (BMI) composite, or about 730° F. for applying a patch formed of polyetherether ketone (PEEK) composite. A variety of composite materials are available for use as joining materials 12 and joining members 14. Composite patches can be used to join structural members 50 formed of titanium, aluminum, other metals, composites, polymers, and the like. Thus, the apparatus 10 can be used with a variety of joining materials 12 and/or joining members 14, which can be selected according to the structural member 50 being joined. Further, the joint can be formed without one or both of the joining material 12 and the joining member 14. For example, the apparatus 10 can be used to sufficiently heat the structural members 50 to melt, sinter, braze, or otherwise join the structural members 50 without either of the joining material 12 or the joining member 14. Alternatively, the apparatus 10 can be used to melt the joining material 12 and fill a gap, crack, hole, or other aperture in or between the structural members 50 with the joining material 12 without the use of a joining member 14. Further, the joining member 14 can be made to function as the joining material 12 by urging the joining member 14 against the structural members 50 and heating the joining member 14 to melt, braze, or otherwise join the joining member 14 to the structural members 50. For example, patches formed of the composite materials listed above can be used as the joining member 14 without a separate joining material to adhere to the structural members 50 and thereby join the structural members 50.

The space 28 between the tool 16 and the structural member 50 at the periphery of the tool 16, shown in FIG. 2, can be provided to allow the tool 16 to be urged against the structural member 50. For example, if the tool 16 is formed of ceramic that is cured on the structural member 50, shims or other spacing members (not shown) can be placed between the tool 16 and the structural member 50 while the tool 16 is being formed. The spacing members are removed before joining the structural member 50. Thus, when the joint is formed, the tool 16 can be urged against the joining member 14 to thereby urge the joining member 14 against the structural member 50.

According to one embodiment of the present invention, the apparatus 10 is used to form a localized joint by first identifying the joint portion 54. The joint portion 54 can include an interface between one or more of the structural members 50, a defective portion 51 of the structural members 50 or joints therebetween, or a portion of the structural members 50 that requires additional joining or additional material for strength, rigidity, bulk, or otherwise. To fill defective portions 51 including cracks, gaps, holes, or other apertures, the joint material 12 can be provided directly in the aperture. If a joining member 14 is to be used, the member 14 can be placed over the joint portion 54 such that the joining material 12 is disposed between the joining member 14 and the structural member 50. For example, protrusions 15 can be provided on a metal joining member 50 by welding the protrusions 15 thereon. The protrusions 15 can be multiple, distinct protrusions on the joining member 50 or a continuous, ridge-like protrusion. The joining member 14 is then positioned against the structural member 50 so that the protrusions 15 are directed toward the structural member 50, and the joining material 12 can be disposed between the joining member 14 and the structural member 50. For example, thin sheets of aluminum can be disposed between a structural member and joining member that are both formed of titanium. The size, shape, and contour of the joining member 14 can be adjusted to correspond to the structural member 50. Similarly, the susceptor 36 can also be configured to correspond to the structural member 50. The susceptor 36 is disposed proximate to the joining member 14 so that the joining member 14 can be heated by the susceptor 36.

The tool 16 is positioned against the structural member 50 such that the induction coil 34 is configured to induce the electromagnetic field substantially uniformly in the susceptor 36. For example, the tool 16 can be formed of ceramic that is disposed over the susceptor 36 and the joining member 14 in an uncured state and cured thereon. The tool structure 18 can be used to provide additional support to the tool 16. The sealing membrane 24, which can be integral to the tool 16 or separate therefrom, is configured over the tool 16 and engaged by the sealing member 14 to the structural member 50. The sealing member 14 can engage the structural member 50 by adhesives, fasteners, magnets, or the like. The evacuation device 26 is then used to evacuate gas from between the sealing membrane 24 and the structural member 50, thereby urging the tool 16 against the structural member 50. The induction coil 24 is connected to the power sources 40 and the coolant source 46. The power source 40 is actuated to an on position to energize the induction coil 34 and induce an electromagnetic field in the susceptor 36, thereby heating the susceptor 36 to the Curie temperature throughout. The coolant source 46 delivers the cooling fluid, such as water, through the induction coil 34 and thereby cools the coil 34 and the tool 16. The susceptor 36, which can be heated rapidly to the Curie temperature, heats the joining material 12, the joining member 14, and/or the structural member 50. As the joining material 12 is heated to the joining temperature, for example, the melting temperature of the joining material 12, the joining material 12 forms a joint between the structural members 50 and the joining member 14. The power source 40 is then actuated to an off position to de-energize the induction coil 34 and thereby stop heating the susceptor 36. The coolant source 46 can continue to circulate the cooling fluid through the induction coil 34 to cool the induction coil 34, tool 16, susceptor 36, structural member 50, joining material 12, and/or joining member 14. The structural member 50, joining material 12, and joining member 14 are cooled, leaving a joint between the structural member 50 and the joining member 14, and the tool 16 is removed from the structural member 50. Further processing can include machining the joining member 14 or the structural member 50, heat treating the joint portion 54, or otherwise processing the joint portion 54 or other portions of the structural members 50.

Figure 5:
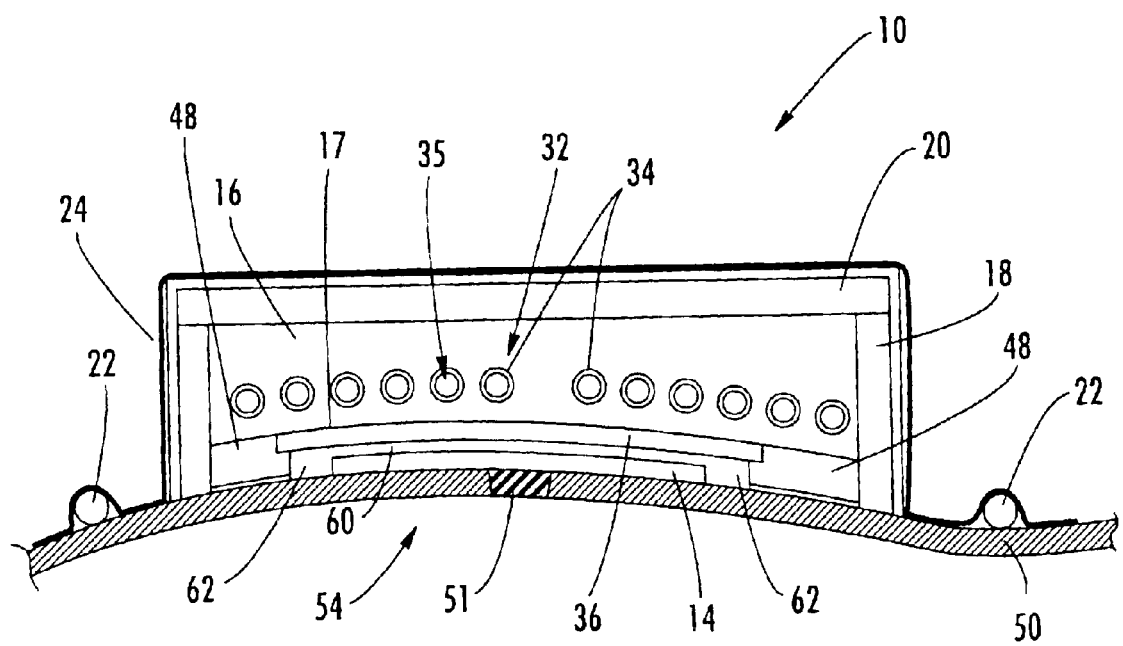
FIG. 5 is a section view of an apparatus for forming a localized joint in a structural member according to another embodiment of the present invention.

According to another embodiment of the present invention, illustrated in FIG. 5, an intermediate layer 60 of material is provided between the susceptor 36 and the joining member 14. The intermediate layer 60 can be formed of a variety of materials. For example, the joining member 14 can be formed of a composite material such as a resin-impregnated fiber matrix, which is provided in a cured or uncured state, and the intermediate layer 60 can be a rubber sheet or other polymer or elastomeric material that is sealed against the structural member 50 and prevents the joining member 14 from spreading or otherwise distorting in shape during processing. The intermediate layer 60 can include a thicker periphery portion 62 that extends as a ridge-like structure around the joining member 14 and toward the structural member 50, and the periphery portion 62 can form a seal against the structural member 50 when urged thereagainst. The intermediate layer 60 can be evacuated through the evacuation tube 30 or there can be provided another evacuation tube (not shown) that extends from the evacuation device 26 to the joining member 14, i.e., extending between the periphery portion 62 and the structural member 50. Thus, air or other gases can be evacuated from between the joining member 14 and the structural member 50 and between the joining member 14 and the intermediate layer 60 so that the intermediate layer 60 is urged against the structural member 50 and the periphery portion 62 seals thereto. Alternatively, the intermediate layer 60 can be formed of a malleable sheet of material, such as aluminum or other metals, that is urged against the joining member 14 and supports and/or retains the joining member 14 during processing, for example, while the joining member 14 is brazed to the structural member 50. Instead of evacuating the space between the intermediate layer 60 and the structural member 50, the space can be purged with an inert gas, such as nitrogen, before or during processing to reduce corrosion or other adverse effects on the joining member 14, the structural member 50, and the joint formed therebetween. The intermediate layer 60 can be removed after the joint is formed or can form an integral part of the joint.

Figure 6:
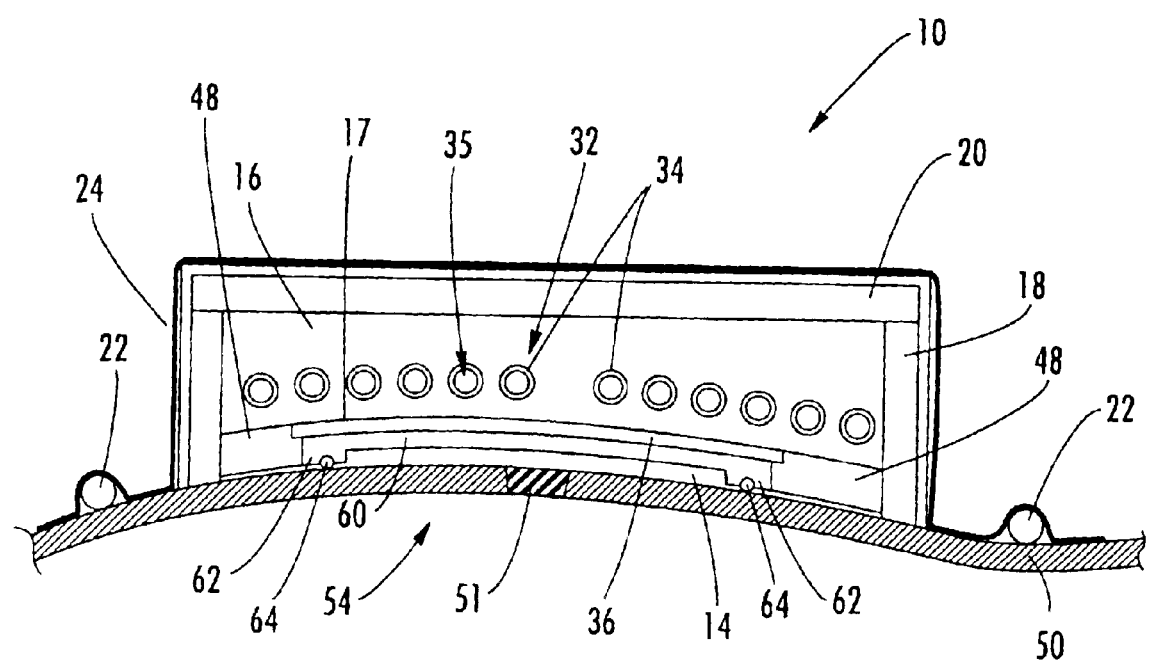
FIG. 6 is a section view of an apparatus for forming a localized joint in a structural member according to yet another embodiment of the present invention.

Further, the intermediate layer 60, which can be contoured and shaped according to the structural member 50 and the joint portion 54 thereof, can define one or more protrusions 64, as shown in FIG. 6. The protrusion 64 extends from the periphery portion 62 of the intermediate layer 60 toward the structural member 50, for example, as a continuous, bead-like structure. The protrusion 64 can facilitate the formation of a seal between the intermediate layer 60 and the structural member 50, and the protrusion 64 can prevent the joining material 12 from being squeezed entirely from between the joining member 14 and the structural member 50 during joining. For example, if the intermediate layer 60 is formed of a semi-rigid or rigid material such as aluminum or other metals, the protrusion 64 can be an o-ring that is disposed in a channel on the periphery portion 62 of the intermediate layer 60 as shown in FIG. 6. The o-ring can be formed of various materials including, for example, metals such as aluminum, brass, and the like, or an elastomeric material. The o-ring can be configured to be deformed between the intermediate layer 60 and the structural member 50 to facilitate the formation of the seal therebetween. Alternatively, the protrusion 64 can be an integral part of the intermediate layer 60 formed by welding the protrusion 64 to the intermediate layer 60, machining the intermediate layer 60 to define the protrusion 64, or otherwise forming the protrusion 64 thereon.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for forming a localized joint in a joint portion of at least one structural member, the apparatus comprising:

a tool corresponding in shape to the joint portion of the at least one structural member;

an induction coil disposed in said tool;

a power source configured to energize said induction coil;

a susceptor disposed between said tool and the at least one structural member, said susceptor having a Curie temperature at which said susceptor becomes paramagnetic; and a sealing member configured to provide a hermetic seal between said tool and the at least one structural member, said sealing member extending around the joint portion of the at least one structural member, wherein said induction coil is configured to induce an electromagnetic field within at least a portion of said susceptor and thereby heat said susceptor to the Curie temperature, thereby heating a portion of the at least one structural member.

2. An apparatus according to claim 1 wherein said tool is formed of ceramic and said induction coil is disposed within said ceramic tool and configured proximate a surface of said tool to substantially uniformly induce an electromagnetic field in said susceptor.

3. An apparatus according to claim 1 wherein the Curie temperature of said susceptor is about equal to a joining temperature of a joining material disposed between said susceptor and the at least one structural member.

4. An apparatus according to claim 1 further comprising a joining member in thermal contact with said susceptor and configured to be joined to the at least one structural member at the Curie temperature of said susceptor, thereby forming the joint.

5. An apparatus according to claim 1 further comprising an evacuation device fluidly connected to a space between said tool and the at least one structural member and configured to remove gas from between said tool and the at least one structural member.

6. An apparatus according to claim 1 further comprising a tool support structure extending around said tool and configured to provide support to said tool.

7. An apparatus according to claim 1 further comprising an electromagnetic shield material provided on said tool and configured to direct the electromagnetic field into said susceptor.

8. An apparatus according to claim 1 further comprising a coolant source fluidly connected to a passage defined by said induction coil, said coolant source configured to circulate a cooling fluid through said induction coil and thereby cool said induction coil.

9. A method for forming a localized joint in a joint portion of at least one structural member, the method comprising:

configuring a susceptor proximate to at least one structural member, the susceptor corresponding to the joint portion of the at least one structural member;

positioning a tool having an induction coil proximate to the susceptor and hermetically sealing the tool to the at least one structural member;

energizing the induction coil to induce an electromagnetic field in the susceptor, thereby heating the susceptor and the at least one structural member; and forming a joint in the joint portion of the at least one structural member.

10. A method according to claim 9 further comprising providing the at least one structural member and a joining material for forming the joint in the at least one structural member, the at least one structural member comprising at least one of the group consisting of titanium and titanium alloys and the joining material comprising at least one of the group consisting of aluminum and aluminum alloys.

11. A method according to claim 9, further comprising selecting at least one material and forming the susceptor from the at least one material according to the at least one structural member such that the Curie temperature of the susceptor corresponds to a joining temperature of the at least one structural member.

12. A method according to claim 9, wherein said positioning step comprises disposing an uncured ceramic material proximate to the at least one structural member and curing the ceramic material to form the tool such that the tool corresponds to at least a portion of the at least one structural member.

13. A method according to claim 9, wherein said energizing step comprises heating the susceptor to a uniform Curie temperature of the susceptor at which the susceptor becomes paramagnetic.

14. A method according to claim 9, further comprising providing a joining material between the susceptor and the at least one structural member and wherein said energizing step comprises heating the joining material to a melting temperature of the joining material.

15. A method according to claim 9, further comprising disposing a joining member between the susceptor and the at least one structural member and joining the joining member to the at least one structural member.

16. A method according to claim 15, wherein said positioning step comprises providing a space between the tool and the at least one structural member around a periphery of the joining member such that urging the tool toward the at least one structural member urges the joining member against the at least one structural member.

17. A method according to claim 15, further comprising disposing a joining material between the at least one structural member and the joining member and wherein said energizing step comprises heating the joining material to at least a melting temperature of the joining material such that the joining material joins the joining member to the at least one structural member.

18. A method according to claim 9, further comprising circulating a cooling fluid through the induction coil and thereby cooling the induction coil.

19. A method according to claim 9, wherein said energizing step comprises actuating an electrical power source in electrical communication with the induction coil to provide an electrical current through the induction coil.

20. A method according to claim 9, further comprising evacuating gas from a space between the tool and the at least one structural member, thereby engaging the tool and the at least one structural member.

21. A product obtained by the method of claim 9.

22. An apparatus for forming a localized joint in a joint portion of at least one structural member from a single side of the structural member, the apparatus comprising:

a tool corresponding in shape to the joint portion of one side of the at least one structural member;

an induction coil disposed in said tool;

a power source configured to energize said induction coil; and a susceptor disposed between said tool and the one side of the at least one structural member such that said induction coil in said tool is positioned opposite said susceptor from the one side of the structural member, said susceptor having a Curie temperature at which said susceptor becomes paramagnetic, wherein said induction coil is configured to induce an electromagnetic field within at least a portion of said susceptor and thereby heat said susceptor to the Curie temperature, thereby heating a portion of the at least one structural member from the one side of the structural member.

23. A method for forming a localized joint in a joint portion of at least one structural member from a single side of the structural member, the method comprising:

configuring a susceptor proximate to one side of the at least one structural member, the susceptor corresponding to the joint portion of the at least one structural member;

positioning a tool having an induction coil proximate to the susceptor and opposite the susceptor from the one side of the structural member such that the susceptor is disposed between the tool and the one side of the structural member;

energizing the induction coil to induce an electromagnetic field in the susceptor, thereby heating the susceptor and the at least one structural member from the one side of the structural member; and forming a joint in the joint portion of the at least one structural member.

* * * * *